US009419305B2

(12) United States Patent
Choi et al.

(10) Patent No.: US 9,419,305 B2
(45) Date of Patent: Aug. 16, 2016

(54) ELECTROLYTE FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Yeon-Joo Choi, Yongin-si (KR); Young-Kee Kim, Yongin-si (KR); Sumihito Ishida, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 483 days.

(21) Appl. No.: 13/872,945

(22) Filed: Apr. 29, 2013

(65) Prior Publication Data
US 2013/0288139 A1 Oct. 31, 2013

(30) Foreign Application Priority Data

Apr. 30, 2012 (KR) .................. 10-2012-0045476

(51) Int. Cl.
*H01M 10/0564* (2010.01)
*H01M 10/0567* (2010.01)
*H01M 10/052* (2010.01)
*H01M 10/0568* (2010.01)

(52) U.S. Cl.
CPC ...... *H01M 10/0564* (2013.01); *H01M 10/0567* (2013.01); *H01M 10/052* (2013.01); *H01M 10/0568* (2013.01)

(58) Field of Classification Search
CPC .......... H01M 10/052; H01M 10/0564; H01M 10/0567; H01M 10/0568
USPC ................... 252/62.2; 429/200, 338
See application file for complete search history.

(56) References Cited

U.S. PATENT DOCUMENTS

| 6,558,846 B1 | 5/2003 | Tsushima et al. |
| 7,572,554 B2 | 8/2009 | Koike et al. |
| 2007/0065727 A1 | 3/2007 | Koike et al. |
| 2008/0176137 A1 | 7/2008 | Endo et al. |
| 2008/0193854 A1 | 8/2008 | Yamaguchi et al. |
| 2009/0098456 A1 | 4/2009 | Park et al. |
| 2010/0183926 A1 | 7/2010 | Kim et al. |
| 2011/0123870 A1 | 5/2011 | Oh et al. |
| 2011/0136018 A1 | 6/2011 | Nogi et al. |
| 2012/0288771 A1 | 11/2012 | Lim et al. |

FOREIGN PATENT DOCUMENTS

| EP | 0 949 702 A1 | 10/1999 |
| EP | 1 280 221 A2 | 1/2003 |
| EP | 2 224 532 A1 | 9/2010 |
| EP | 2 262 047 A1 | 12/2010 |
| EP | 2 498 329 A1 | 9/2012 |
| EP | 2 503 633 A2 | 9/2012 |
| JP | 2000-106218 | 4/2000 |
| JP | 2006-128049 | 5/2005 |
| JP | 2007-123097 | 5/2007 |
| JP | 2009-176534 | 8/2009 |
| JP | 2009-245828 | 10/2009 |
| JP | 2009-245888 | 10/2009 |
| KR | 10-2005-0063915 | 6/2005 |
| KR | 10-2007-0095785 A | 10/2007 |
| KR | 10-2008-0000595 | 1/2008 |
| KR | 10-2008-0086638 A | 9/2008 |
| KR | 10-2008-0097599 | 11/2008 |
| KR | 10-2009-0053467 | 5/2009 |
| KR | 10-2010-0086370 | 7/2010 |
| KR | 10-2011-0036107 A | 4/2011 |
| KR | 10-2011-0058507 | 6/2011 |
| WO | WO 2006/109909 A1 | 10/2006 |
| WO | WO 2007/043624 A | 4/2007 |

OTHER PUBLICATIONS

EPO Search Report dated Sep. 12, 2013, for corresponding European Patent application 13165433.7, (10 pages).
Zhang, S., *A review on electrolyte additives for lithium-ion batteries*, Journal of Power Sources, ScienceDirect, vol. 162, No. 2, Nov. 22, 2006, pp. 1379-1394, XP027938606.
EPO Office action dated May 30, 2014, for corresponding European Patent application 13165433.7, (7 pages).
Patent Abstracts of Japan, and English machine translation of Japanese Patent application 2000-106218 dated Apr. 11, 2000, (10 pages).
Patent Abstracts of Japan, and English machine translation of Japanese Patent application 2006-128049 dated May 18, 2006, (9 pages).
U.S. Office action dated Mar. 18, 2011, for cross reference U.S. Appl. No. 12/876,897, (8 pages).

(Continued)

*Primary Examiner* — Edward Cain
(74) *Attorney, Agent, or Firm* — Lewis Roca Rothgerber Christie LLP

(57) ABSTRACT

An electrolyte for rechargeable lithium battery includes a lithium salt, a non-aqueous organic solvent, a first additive represented by the following Chemical Formula 1, and a second additive represented by the following Chemical Formula 2.

Chemical Formula 1

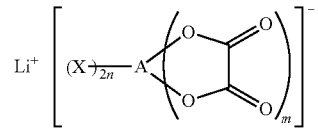

Chemical Formula 2

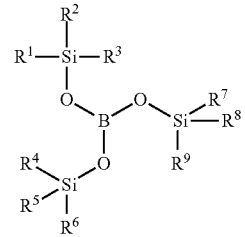

A rechargeable lithium battery includes the electrolyte.

13 Claims, 5 Drawing Sheets

(56) References Cited

OTHER PUBLICATIONS

KIPO Office action dated Jul. 29, 2011, corresponding to Korean Patent application 10-2009-0115325, (5 pages).
KIPO Notice of Allowance dated Mar. 15, 2012, corresponding to Korean Patent application 10-2009-0115325, (5 pages).
Patent Abstracts of Japan, and English machine translation of Japanese Publication 2007-123097 dated May 17, 2007, (32 pages).
Patent Abstracts of Japan, and English machine translation of Japanese Publication 2009-176534 dated Aug. 6, 2009, (28 pages).
Patent Abstracts of Japan, and English machine translation of Japanese Publication 2009-245888 dated Oct. 22, 2009, (19 pages).
KIPO Office action dated May 17, 2016, for Korean priority Patent application 10-2012-0045476, (7 pages).
English machine translation of Japanese Publication 2009-245828 dated Oct. 22, 2009, (21 pages).

ELECTROLYTE FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2012-0045476 filed in the Korean Intellectual Property Office on Apr. 30, 2012, the entire content of which is incorporated herein by reference.

BACKGROUND

1. Field

The present invention relates to an electrolyte for rechargeable lithium battery and a rechargeable lithium battery including the same.

2. Description of the Related Art

Energy storage technologies have recently been drawing attention. As the application of energy storage technologies is widened into the fields of mobile phones, camcorders, laptop computers, personal computers (PCs), and even automobiles, the demand for high energy densification of a battery that is used as power source of for electronic devices is increasing.

A rechargeable lithium battery is a battery that best satisfies the high energy demand of these technologies, and researchers are studying rechargeable lithium batteries in more detail. A rechargeable lithium battery includes a positive electrode including a positive active material that intercalates and deintercalates lithium, a negative electrode including a negative active material that intercalates and deintercalates lithium, and an electrolyte.

When a rechargeable lithium battery is initially charged, the lithium ions that come out of the positive active material, such as lithium transition metal oxide, transfer to the negative active material and are implanted between the layers of the negative active material. Because lithium has strong reactivity, the electrolyte and a lithium salt react with each other on the surface of the negative active material to form a solid electrolyte interface (SEI) film.

The SEI film serves as an ion tunnel and allows only lithium ions to pass through. The SEI film prevents organic solvent molecules having a high molecular weight from transferring along with the lithium ions in the electrolyte, thereby preventing the high molecular weight organic solvent molecules from being implanted between the layers of the negative active material and destroying or damaging the structure of the negative electrode. Therefore, as the SEI film prevents contact between the organic solvent molecules in the electrolyte and the negative active material, the electrolyte does not decompose and the amount of lithium ions in the electrolyte solution is maintained. Thus, stable charge and discharge characteristics may be obtained.

The formation of the stable SEI film is related to the charge and discharge rate capability and cycle-life of the rechargeable lithium battery. Particularly, since a hybrid battery, such as an ISG (Idle Stop and Go) battery for automobiles, concurrently (e.g., simultaneously) requires a high charge and discharge rate capability, stable cycle-life characteristics, and stability at a low temperature, it is more important to form a stable SEI film.

SUMMARY

Aspects of embodiments of the present invention are directed to an electrolyte for a rechargeable lithium battery capable of improving charge and discharge rate capability, cycle-life characteristics, low temperature stability of the rechargeable lithium battery. Another embodiment is directed to a rechargeable lithium battery including the electrolyte.

According to an embodiment of the present invention, an electrolyte for a rechargeable lithium battery includes a lithium salt, a non-aqueous organic solvent, a first additive represented by the following Chemical Formula 1, and a second additive represented by the following Chemical Formula 2:

Chemical Formula 1

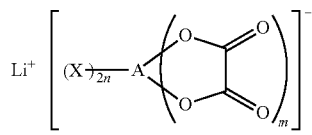

wherein, in Chemical Formula 1, A is boron (B) or phosphorus (P), X is a halogen, n is an integer ranging from 0 to 2, m is an integer ranging from 1 to 3, and when A is boron (B), n+m=2, and when A is phosphorus (P), n+m=3, Chemical Formula 2

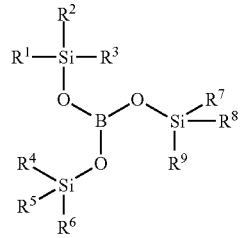

wherein in Chemical Formula 2, $R^1$ to $R^9$ are each independently selected from hydrogen, a substituted C1 to C10 alkyl group, or an unsubstituted C1 to C10 alkyl group.

The first additive may be a compound selected from compounds represented by the following Chemical Formulae 1a to 1e or combinations thereof:

Chemical Formula 1a

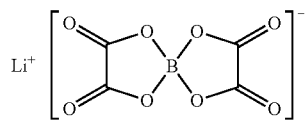

Chemical Formula 1b

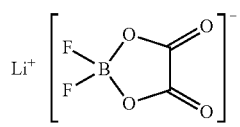

Chemical Formula 1c

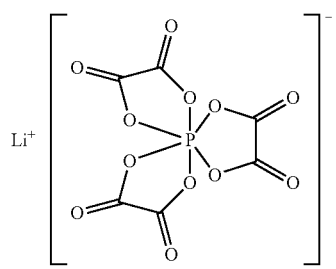

-continued

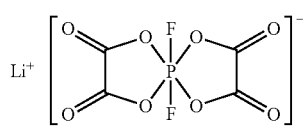

Chemical Formula 1d

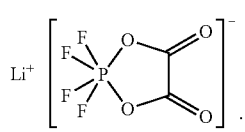

Chemical Formula 1e

The first additive and the second additive may each be included at about 0.1 wt % to about 5 wt % based on the total weight of the electrolyte. In some embodiments, the first additive may be included at about 0.5 wt % to about 1.5 wt % based on the total weight of the electrolyte. In some embodiments, the second additive may be included at about 0.1 wt % to about 1 wt % based on the total weight of the electrolyte.

The first additive may be a compound represented by the following Chemical Formula 1d, and the second additive may be a compound represented by the following Chemical Formula 2a:

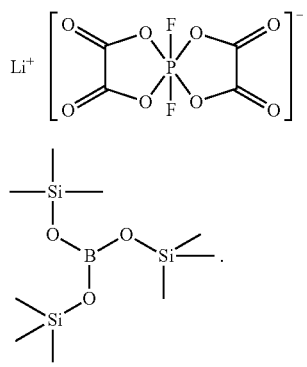

Chemical Formula 1d

Chemical Formula 2a

The non-aqueous organic solvent may include ethylene carbonate (EC), ethylmethyl carbonate (EMC), and dimethyl carbonate (DMC), and the ethylene carbonate (EC) may be included at greater than or equal to about 30 wt % based on the total weight of the non-aqueous organic solvent.

In some embodiments, a rechargeable lithium battery includes a positive electrode including a positive active material layer, a negative electrode including a negative active material layer, and the electrolyte described above.

The positive active material layer may include lithium metal oxide and activated carbon. The activated carbon may be included at about 0.01 wt % to about 20 wt % based on the total weight of the lithium metal oxide and activated carbon.

The negative active material layer may include soft carbon.

Each of the first additive may be present at about 0.005 M to about 2 M and the second additive may be present at about 0.005 M to about 2 M in at least one of the positive electrode or the negative electrode.

The rechargeable lithium battery may include a SEI (solid electrolyte interface) film on the surface of the negative electrode.

In some embodiments, a rechargeable lithium battery including the above described electrolyte has a high charge and discharge rate capability, stable cycle-life characteristics, and stability at low temperatures. Such a battery may meet the requirements of a hybrid battery, such as an ISG battery for automobiles. Therefore, a battery that has 5 to 10 times longer cycle-life than conventional batteries, while having high power characteristics and a compact size that is smaller than the conventional batteries, may be provided.

DETAILED DESCRIPTION

Figure 1:
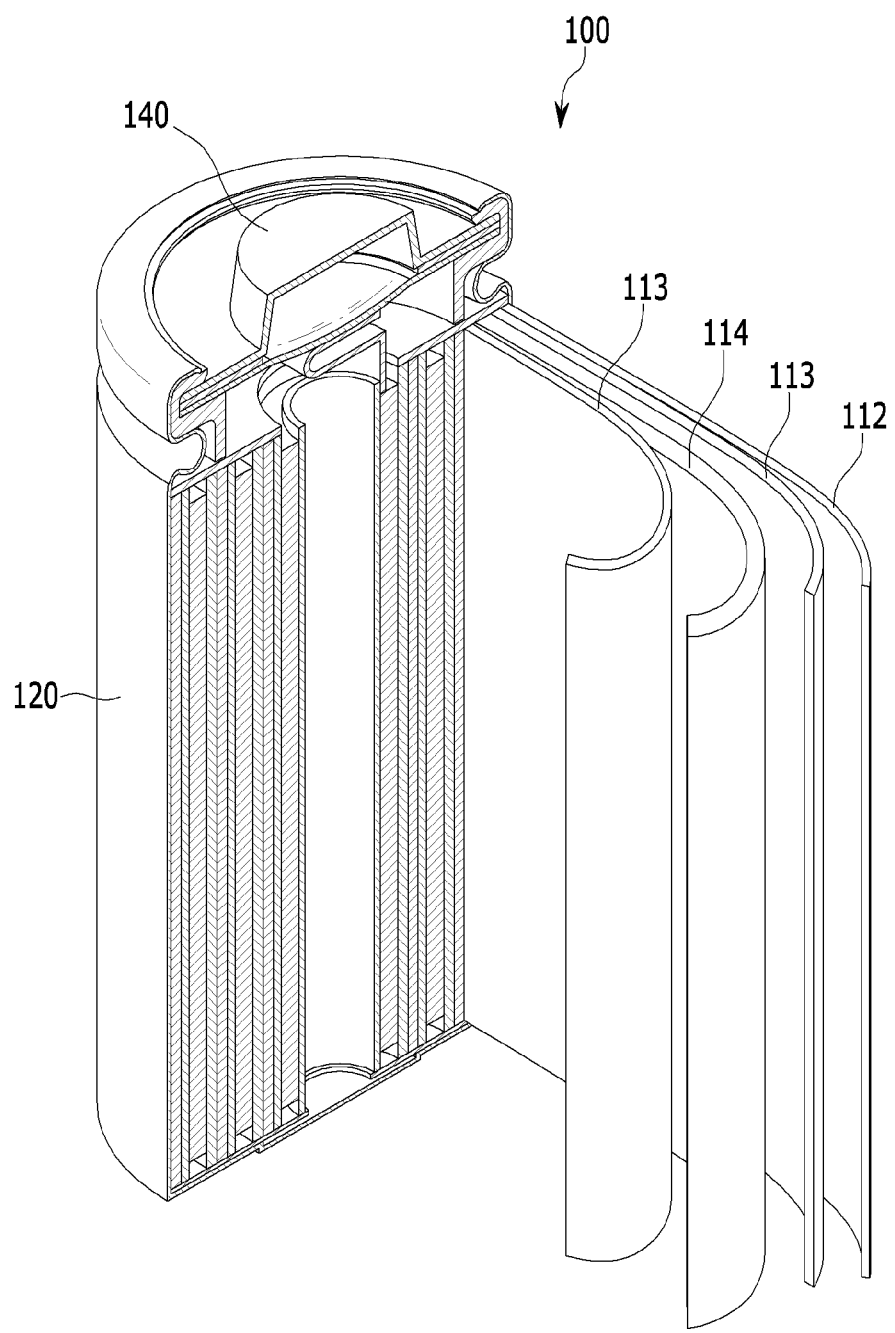
FIG. 1 is a partially exploded perspective view of a rechargeable lithium battery according to one embodiment.

This disclosure will be described more fully hereinafter, in which exemplary embodiments of the invention are shown. As those skilled in the art would realize, the described embodiments may be modified in various different ways, all without departing from the spirit or scope of the present invention.

As used herein, when a definition is not otherwise provided, the term 'substituted' may refer to a compound or group substituted with a substituent selected from a halogen atom (F, Br, Cl, or I), a hydroxyl group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and/or a combination thereof.

As used herein, when a definition is not otherwise provided, the term 'hetero' may refer to a compound or group including 1 to 3 heteroatoms selected from, N, O, S, and/or P.

An electrolyte for a rechargeable lithium battery according to one embodiment includes a lithium salt, a non-aqueous organic solvent, and an additive.

The lithium salt is dissolved in the non-aqueous organic solvent and supplies lithium ions in the rechargeable lithium battery, and improves lithium ion transfer between positive and negative electrodes.

The lithium salt may be $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiCl, LiI, or a mixture thereof, but it is not limited thereto.

In some embodiments, the lithium salt may be included at a concentration of about 0.1 to about 2.0 M. When the lithium salt is included within the above concentration range, it improves electrolyte performance and lithium ion mobility due to optimal electrolyte conductivity and viscosity.

The non-aqueous organic solvent plays a role of transmitting ions that take part in the electrochemical reaction of a battery. The non-aqueous organic solvent may include a carbonate-based, ester-based, ether-based, ketone-based, alcohol-based, or aprotic solvent, or a mixture thereof.

The carbonate-based solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and/or the like.

For example, the carbonate-based solvent may be a combination of ethylene carbonate (EC), ethylmethyl carbonate (EMC), and dimethyl carbonate (DMC). In some embodiments, the ethylene carbonate (EC) is included in an amount of greater than or equal to about 30 wt % based on the total weight of the non-aqueous organic solvent. In some embodiments, the ethylene carbonate (EC) may be included in an amount of greater than or equal to about 30 to about 90 wt %. When the amount of the ethylene carbonate (EC) falls within the above range, ionic conductivity may be improved due to an increase in the dielectric constant.

The ester-based solvent may include methyl acetate, ethyl acetate, n-propyl acetate, dimethylacetate, methylpropionate, ethylpropionate, gamma-butyrolactone, decanolide, gamma-valerolactone, mevalonolactone, caprolactone, and/or the like.

The ether-based solvent may include dibutyl ether, tetraglyme, diglyme, dimethoxyethane, 2-methyltetrahydrofuran, tetrahydrofuran, and/or the like. The ketone-based solvent may include cyclohexanone and/or the like.

The alcohol-based solvent may include ethanol, isopropyl alcohol, and/or the like. The aprotic solvent include nitriles such as R—CN (wherein R is a C2 to C20 linear, branched, or cyclic hydrocarbon group, and may include a double bond, an aromatic ring, or an ether bond), amides such as dimethylformamide or dimethylacetamide, dioxolanes such as 1,3-dioxolane, sulfolanes, and/or the like.

The non-aqueous organic solvent may be used singularly or in a mixture. When the organic solvent is used in a mixture, its mixture ratio can be controlled in accordance with a desired performance of a battery.

In some embodiments, the carbonate-based solvent includes a mixture of a cyclic carbonate and a linear carbonate. The cyclic carbonate and the linear carbonate are mixed together in a volume ratio of about 1:1 to about 1:9, which can enhance performance of the electrolyte.

In addition, the non-aqueous organic solvent may be prepared by further adding an aromatic hydrocarbon-based solvent to the carbonate-based solvent. The carbonate-based solvent and the aromatic hydrocarbon-based solvent may be mixed in a volume ratio of about 1:1 to about 30:1.

The aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and/or a combination thereof.

The additive includes a first additive represented by the following Chemical Formula 1.

Chemical Formula 1

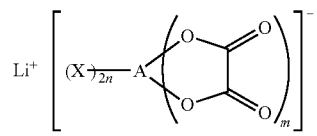

In Chemical Formula 1, A is boron (B) or phosphorus (P), X is a halogen, n is an integer ranging from 0 to 2, m is an integer ranging from 1 to 3, when A is boron (B), n+m=2, and when A is phosphorus (P), n+m=3.

The first additive may include an oxalatoborate-based compound and an oxalatophosphate-based compound. For example, the oxalatoborate-based compound may be lithium bis(oxalato) borate represented by the following Chemical Formula 1a or lithium difluoro(oxalato) borate represented by the following Chemical Formula 1b. The oxalatophosphate-based compound may be lithium tris(oxalato) phosphate represented by the following Chemical Formula 1c, lithium difluoro bis(oxalato) phosphate represented by the following Chemical Formula 1d, or lithium tetrafluoro(oxalato) phosphate represented by the following Chemical Formula 1e.

Chemical Formula 1a

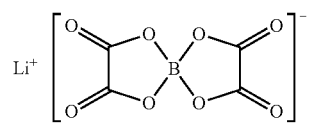

Chemical Formula 1b

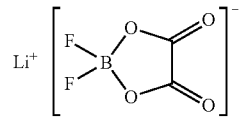

Chemical Formula 1c

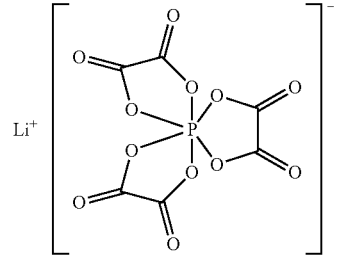

Chemical Formula 1d

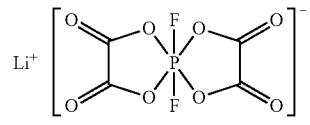

Chemical Formula 1e

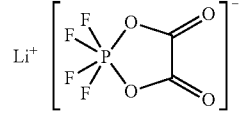

An SEI film that is a porous thin inorganic passivation film may be formed of a compound that may function as an SEI film-forming material in the rechargeable lithium battery. The rechargeable lithium battery including the SEI film may simultaneously satisfy high output characteristics and low-temperature characteristics.

In an embodiment, the first additive is included in an amount of about 0.1 wt % to about 5 wt % based on the total weight of the electrolyte. When the first additive is included in the amount of the range, the electrolyte may have improved ionic conductivity and may form an SEI film having proper pores. In some embodiments, the first additive may be included in an amount of about 0.5 wt % to about 1.5 wt % based on the total weight of the electrolyte.

The additive may include a second additive represented by the following Chemical Formula 2.

Chemical Formula 2

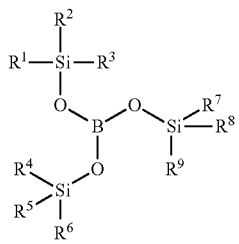

In Chemical Formula 2, $R^1$ to $R^9$ are each independently hydrogen or a substituted or unsubstituted C1 to C10 alkyl group. In another embodiment, $R^1$ to $R^9$ are each independently a substituted or unsubstituted C1 to C4 alkyl group, and in still another embodiment, $R^1$ to $R^9$ are each independently unsubstituted C1 to C2 alkyl group.

The second additive may be a compound represented by the following Chemical Formula 2a:

Chemical Formula 2a

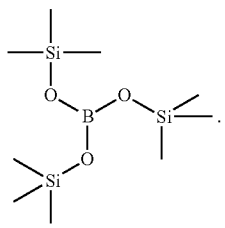

In some embodiments, the second additive suppresses the formation of LiF through a side reaction when the SEI film is formed with the first additive, and accordingly the output characteristics of the rechargeable lithium battery are improved.

In some embodiments, the second additive is included in an amount of about 0.1 wt % to about 5 wt % based on the total weight of the electrolyte. When the second additive is included in the amount of the range, the electrolyte may have improved ionic conductivity while effectively suppressing the side reaction occurring during the formation of the SEI film. In some embodiments, the second additive may be included in an amount of about 0.1 wt % to about 1 wt % based on the total weight of the electrolyte.

The first additive and the second additive may be included in a weight ratio of about 1:0.1 to about 1:4. When the first and the second additive are included within the above weight ratio, the above described effects may be obtained.

The electrolyte may form a stable SEI film by including both of the first additive and the second additive. Therefore, when the electrolyte is used in a rechargeable lithium battery, not only the charge and discharge rate capability and cycle-life characteristics are improved, but also low-temperature characteristics are improved.

According to another embodiment, a rechargeable lithium battery including the electrolyte is provided.

The rechargeable lithium battery may be classified as a lithium ion battery, a lithium ion polymer battery, or a lithium polymer battery according to the presence of a separator and the kind of electrolyte used therein. The rechargeable lithium battery may have a variety of shapes and sizes and may be a cylindrical, prismatic, coin, or pouch-type battery and may be a thin film type or a bulk type. The structure and fabrication method for a lithium ion battery pertaining to embodiments present invention are known to those of skill in the art.

FIG. 1 is an exploded perspective view of a rechargeable lithium battery according to one embodiment.

Referring to FIG. 1, the rechargeable lithium battery 100 is a cylindrical battery including a negative electrode 112, a positive electrode 114, and a separator 113 interposed between the negative electrode 112 and the positive electrode 114. An electrolyte (not shown) impregnates the negative electrode 112, the positive electrode 114, and the separator 113. The lithium secondary battery 100 is fabricated by sequentially stacking the negative electrode 112, the separator 113, and the positive electrode 114, and spiral-winding them and housing the wound product in a battery case 120. A sealing member 140 seals the battery case 120.

The negative electrode 112 includes a current collector and a negative active material layer formed on the current collector.

The current collector may be a copper foil, a nickel foil, a stainless steel foil, a titanium foil, a nickel foam, a copper foam, a polymer substrate coated with a conductive metal, or combinations thereof.

The negative active material layer may include a negative active material, a binder, and optionally a conductive material.

The negative active material may include a material that reversibly intercalates/deintercalates lithium ions, a lithium metal, a lithium metal alloy, a material capable of doping and dedoping lithium, a transition metal oxide, or combinations thereof.

The material that reversibly intercalates/deintercalates lithium ions may be a carbon material. The carbon material may be any carbon-based negative active material that is generally used in a lithium ion rechargeable battery. Examples of the carbon material include crystalline carbon, amorphous carbon, and/or a mixture thereof. The crystalline carbon may be non-shaped or sheet, flake, spherical, or fiber shaped natural graphite or artificial graphite. The amorphous carbon may be a soft carbon, a hard carbon, mesophase pitch carbonization products, fired coke, and/or the like.

Particularly, because soft carbon has higher output characteristics, shorter charge time, lower price, and higher stability than graphite or hard carbon, it is appropriate for a large-capacity battery, such as an ISG battery for automobiles.

The lithium metal alloy includes lithium and a metal selected from Na, K, Rb, Cs, Fr, Be, Mg, Ca, Sr, Si, Sb, Pb, In, Zn, Ba, Ra, Ge, Al, and/or Sn.

The material capable of doping and dedoping lithium may include Si, $SiO_x$ (0<x<2), a Si—C composite, a Si-Q alloy (wherein Q is not Si and is selected from an alkali metal, an alkaline-earth metal, a Group 13 to Group 16 element, a transition element, a rare earth element, or a combination thereof), Sn, $SnO_2$, a Sn—C composite, a Sn—R alloy (wherein R is not Si and is selected from an alkali metal, an alkaline-earth metal, a Group 13 to Group 16 element, a transition element, a rare earth element, or a combination thereof), and/or the like. The elements Q and R may include an element selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may include vanadium oxide, lithium vanadium oxide, and/or the like.

The binder improves properties of binding active material particles with one another and to a current collector. Examples of the binder include polyvinylalcohol, carboxylmethylcellulose, hydroxypropylcellulose, polyvinylchloride, carboxylated polyvinylchloride, polyvinylfluoride, an ethyleneoxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but it is not limited thereto.

The conductive material is included to improve electrode conductivity. Any electrically conductive material may be used as a conductive material unless it causes a chemical change in the rechargeable lithium battery. Examples of the conductive material include: a carbon-based material such as natural graphite, artificial graphite, carbon black, acetylene black, Ketjen black, a carbon fiber, and/or the like; a metal-based material such as a metal powder or a metal fiber including copper, nickel, aluminum, silver, and/or the like; a conductive polymer such as polyphenylene derivative and/or the like; or a mixture thereof.

The positive electrode 114 includes a current collector and a positive active material layer disposed on at least one side of the current collector.

The current collector may be Al, but it is not limited thereto.

The positive active material layer includes a positive active material, a binder, and optionally a conductive material.

The positive active material includes lithiated intercalation compounds that reversibly intercalate and deintercalate lithium ions. The positive active material may include a lithium composite oxide including cobalt, manganese, nickel, or a combination thereof. In particular, the following compounds may be used:

$Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$, and $0 \leq c \leq 0.05$); $LiE_{2-b}R_bO_{4-c}D_c$ ($0 \leq b \leq 0.5$ and $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$, and $0 < \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$, and $0 < \alpha < 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$, and $0 < \alpha < 2$); $Li_aNi_{1-b-c}Mn_bR_cD_\alpha$ ($0.90 \leq a \leq 1.8$, $0 \leq b \leq 0.5$, $0 \leq c \leq 0.05$, and $0 < \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$, and $0 < \alpha < 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$, and $0 < \alpha < 2$); $Li_aN_{i_b}E_cG_dO_2$ ($0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 5$, and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

An exemplary positive active material may be lithium transition metal oxide. Furthermore, the positive active material may further include activated carbon. Activated carbon may be included in the form of activated carbon powder or activated carbon fiber, and due to the high effective specific surface area of activated carbon, the adsorption amount of the electrolyte is high. Thus, it is appropriate for a battery requiring high power characteristics, such as an ISG battery for automobiles.

The activated carbon may be included in an amount of about 0.01 wt % to about 20 wt % based on the total weight of the lithium metal oxide and the activated carbon. In some embodiments, the activated carbon may be included in an amount of about 1 wt % to about 10 wt % based on the total weight of the lithium metal oxide and the activated carbon.

The forgoing compounds may have a coating layer on their surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and/or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed on the positive active material using any method that does not have an adverse influence on the properties of the positive active material. For example, the coating layer may be formed by any coating method such as spray coating, dipping, or the like, wherein the coating layer formation is known to those of ordinary skill in the art.

The binder improves properties of binding positive active material particles to each other and to the current collector. Examples of the binder include polyvinylalcohol, carboxylmethylcellulose, hydroxypropylcellulose, diacetylcellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but it is not limited thereto.

The conductive material is included to improve electrode conductivity. Any electrically conductive material may be used as a conductive material unless it causes a chemical change in the rechargeable lithium battery. Examples of the conductive material include: a carbon-based material such as natural graphite, artificial graphite, carbon black, acetylene black, Ketjen black, a carbon fiber, and/or the like; a metal-based material such as a metal powder or a metal fiber including copper, nickel, aluminum, silver, and/or the like; a conductive polymer such as polyphenylene derivative and/or the like; or a mixture thereof.

Each of the negative electrode 112 and positive electrode 114 may be fabricated by mixing an active material, a conductive material, and a binder in a solvent to prepare an active material composition. Each active material composition may then be coated on a current collector. Electrode-fabrication methods are known to those of ordinary skill in the art. The solvent includes N-methylpyrrolidone, water, or the like, but it is not limited thereto.

The electrolyte is the same as described above.

Each of the first additive and the second additive of the electrolyte may remain on at least one of the negative electrode 112 or the positive electrode 114, and the remaining amount may range from about 0.005 to about 2 M. Furthermore, after at least ten charge and discharge cycles, the first additive may be in the electrolyte at about 0.005 M to about 2 M and the second additive may be in the electrolyte at about 0.005 M to about 2 M.

The separator 113 separates the positive electrode 114 and negative electrode 112 and provides a path for transferring lithium ions. The separator 113 may be any separator that is generally used in a lithium ion battery. The separator may have low resistance with respect to ion movement of the electrolyte and excellent impregnating capability of the electrolyte. The separator may include a material selected from a glass fiber, polyester, TEFLON (tetrafluoroethylene), polyethylene, polypropylene, polytetrafluoroethylene (PTFE), or a combination thereof and may have a non-woven fabric type or a fabric type. For example, a polyolefin-based polymer separator such as polyethylene, polypropylene, or the like may be used. A separator coated with a ceramic component or a polymer material may be used to secure heat resistance or mechanical strength. The separator may have a single layer or may have multiple layers.

The following examples illustrate the present invention in more detail. These examples, however, should not in any sense be interpreted as limiting the scope of the present invention.

Fabrication of Rechargeable Lithium Battery Cell

Example 1

1.15 M $LiPF_6$ solution was prepared by mixing ethylene carbonate (EC), ethylmethyl carbonate (EMC), and dimethyl carbonate (DMC) in a weight ratio of 3:4:3 and adding $LiPF_6$ to thereto. Subsequently, an electrolyte was prepared by adding 0.5 wt % of lithium difluoro bis(oxalato)phosphate (Li DFBOP) represented by the following Chemical Formula 1d based on the total weight of the electrolyte and 0.5 wt % of tris(trimethylsilyl)borate (TMSB) represented by the following Chemical Formula 2a based on the total weight of the electrolyte, to the $LiPF_6$ solution.

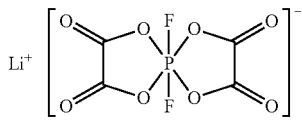

Chemical Formula 1d

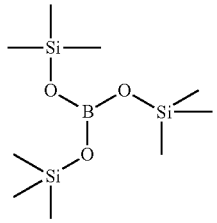

Chemical Formula 2a

A positive active material was prepared by mixing 95 wt % of lithium nickel cobalt manganese oxide ($LiNi_{1/3}Co_{1/3}Mn_{1/3}O_2$) and 5 wt % of activated carbon. Then, a positive electrode slurry was prepared by mixing the positive active material with polyvinylidene fluoride (PVDF), which is a binder, and carbon, which is a conductive material, in a weight ratio of 92:4:4, and adding N-methyl-2-pyrrolidone thereto. A positive electrode was fabricated by coating 20 µm-thick aluminum foil with the prepared positive electrode slurry so as to form an electrode, and then drying and winding the electrode in a vacuum oven set to 120° C.

A negative electrode slurry was prepared by mixing soft carbon as a negative active material and styrene-butadiene rubber (SBR) as a binder and carboxymethyl cellulose as a binder in a weight ratio of 97:1.5:1.5, adding water, and dispersing it. A negative electrode was prepared by coating a 15 µm-thick copper foil with the prepared negative electrode slurry so as to form a current collector, and then drying and winding the current collector in a vacuum oven set to 120° C.

An electrode assembly was fabricated by using a porous separation layer formed of 25 µm-thick polyethylene as a separator between the fabricated positive electrode and the negative electrode. The electrode assembly was wound and compressed and inserted into a cylindrical can. A rechargeable lithium battery cell was fabricated by implanting the prepared electrolyte solution into the cylindrical can and sealing it (e.g., providing an airtight seal).

Example 2

A rechargeable lithium battery cell was fabricated according to the same method as Example 1, except that lithium difluoro bis(oxalato)phosphate (Li DFBOP) was used in an amount of 1 wt % instead of 0.5 wt %.

Example 3

A rechargeable lithium battery cell was fabricated according to the same method as Example 1, except that lithium difluoro bis(oxalato)phosphate (Li DFBOP) was used in an amount of 1.5 wt % instead of 0.5 wt %.

Example 4

A rechargeable lithium battery cell was fabricated according to the same method as Example 1, except that lithium difluoro bis(oxalato)phosphate (Li DFBOP) was used in an amount of 1 wt % instead of 0.5 wt % and tris(trimethylsilyl)borate (TMSB) was used in an amount of 1 wt % instead of 0.5 wt %.

Comparative Example 1

A rechargeable lithium battery cell was fabricated according to the same method as Example 1, except that lithium difluoro bis(oxalato)phosphate (Li DFBOP) and tris(trimethylsilyl)borate (TMSB) were not used.

Comparative Example 2

A rechargeable lithium battery cell was fabricated according to the same method as Example 1, except that tris(trimethylsilyl)borate (TMSB) was not used.

Evaluation 1: Analysis of Electrolyte Component in Electrode

The rechargeable lithium battery cell fabricated according to Example 2 was charged and discharged at 1 C for 10 times, and then electrolyte components remaining in the positive electrode were analyzed.

Figure 2A:
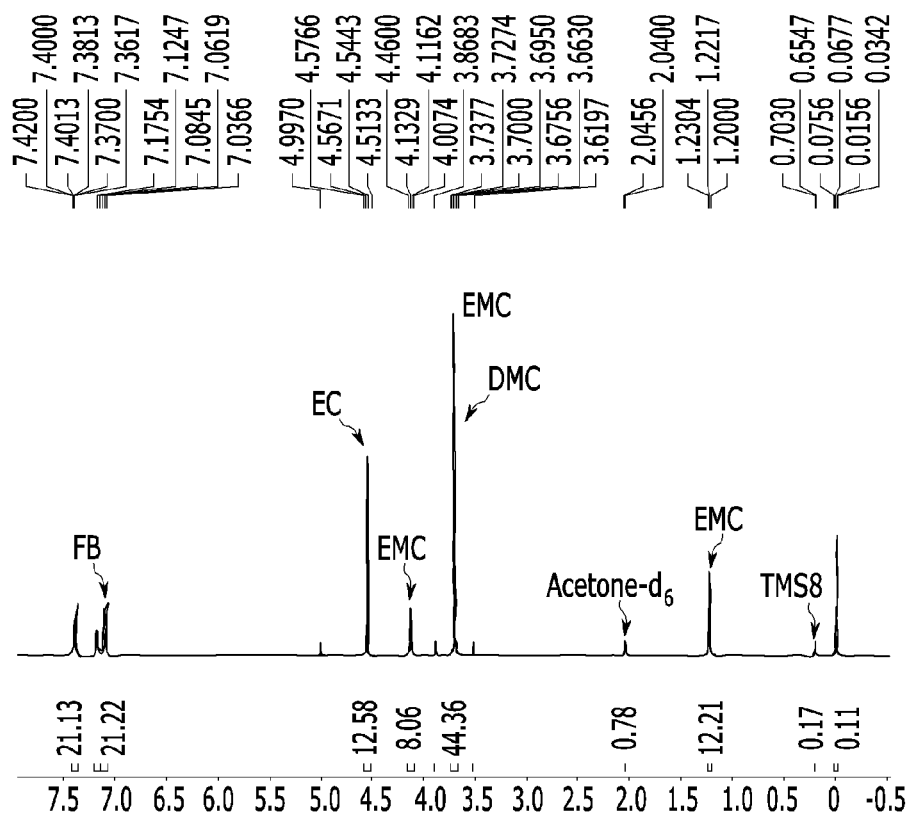
FIGS. 2A and 2B are graphs analyzing the electrolyte components of a rechargeable lithium battery cell fabricated according to Example 2 that remain in a positive electrode after the rechargeable lithium battery cell was charged and discharged 10 times.
Figure 2B:
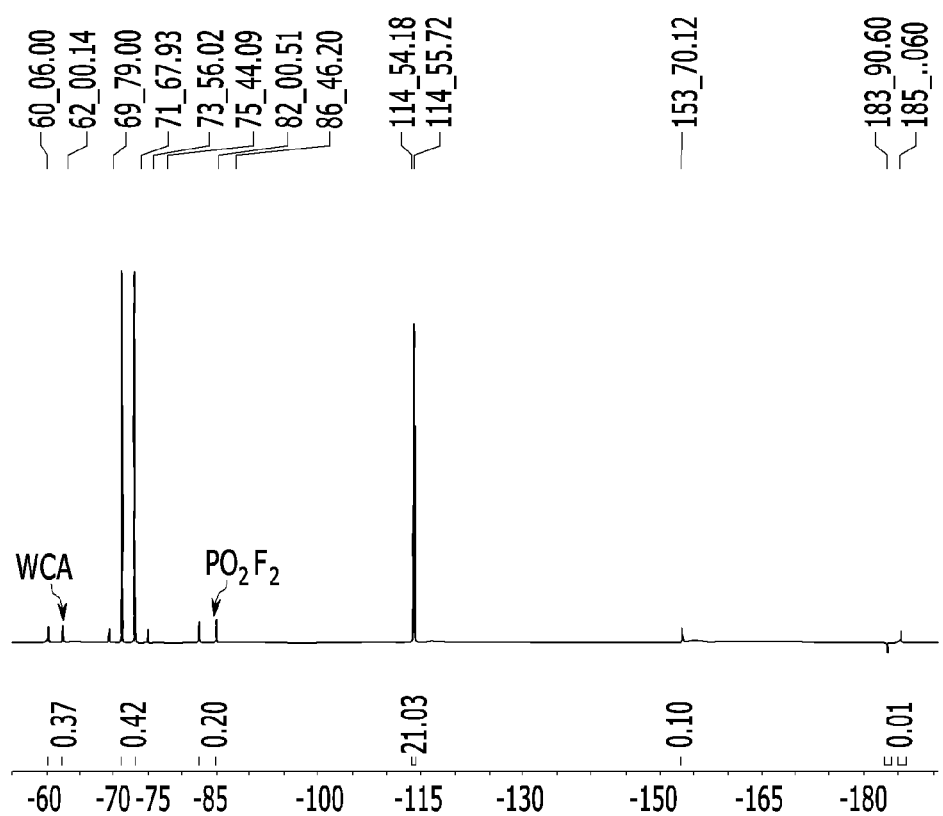

The electrolyte components were analyzed with $^1$H-NMR and $^{19}$F-NMR, and the analysis results were as shown in FIGS. 2A and 2B and Table 1.

FIGS. 2A and 2B are graphs analyzing the electrolyte components of the rechargeable lithium battery cell fabricated according to Example 2 that remain in a positive electrode after the rechargeable lithium battery cell was charged and discharged 10 times.

TABLE 1

| | $^1$H-NMR | | | $^{19}$F-NMR | |
|---|---|---|---|---|---|
| Component | Chemical shift | Quantitative (M) | Component | Chemical shift | Quantitative (M) |
| EC | 4.56 | 3.23 | $PF_6^-$ | −72.7 | 1.07 |
| EMC | 1.22, 3.71, 4.14 | 4.07 | $PO_2F_2^-$ | −81.3, −83.9 | 0.10 |
| DMC | 3.71 | 5.29 | Li DFBOP | −60.89, −63.00 | 0.04 |
| TMSB | 0.20 | 0.06 | FB (ref.) | −114 | 10.57 |
| FB (ref.) | 7.0-7.1, 7.3-7.4 | 10.56 | | | |

It may be seen from FIGS. 2A and 2B and Table 1 that the electrolyte components remaining in the positive electrode after the fabrication of the battery cell may be analyzed using $^1$H-NMR and $^{19}$F-NMR. Particularly, the remaining amounts of lithium difluoro bis(oxalato)phosphate (Li DFBOP) and tris(trimethylsilyl)borate (TMSB), which are electrolytic additives, were about 0.04 M and about 0.06 M, respectively.

Evaluation 2: Charge and Discharge Rate Capability

The charge and discharge rate capability (e.g., charge and discharge capacity) of the rechargeable lithium battery cells fabricated according to Examples 1 to 4 and Comparative Examples 1 and 2 were evaluated.

The initial capacity and the capacity after charging and discharging the cells at 1 C for 50 times were compared with each other, and the average value after measuring them 3 times was obtained as the charge and discharge rates. The results are shown in Table 2.

TABLE 2

| | Discharge rate capability (%) | Charge rate capability (%) |
|---|---|---|
| Example 1 | 84.1 | 74.2 |
| Example 2 | 86.4 | 75.9 |
| Example 3 | 82.2 | 74.9 |
| Example 4 | 85.1 | 74.4 |
| Comparative Example 1 | 74.3 | 71.2 |
| Comparative Example 2 | 83.0 | 73.4 |

It may be seen from Table 2 that when the rechargeable lithium battery cells fabricated according to Examples 1 to 4 were compared with the rechargeable lithium battery cell fabricated according to Comparative Example 1, both charge rate capability and discharge rate capability were improved. Also, it may be seen that when the rechargeable lithium battery cells fabricated according to Examples 1 to 4 were compared with the rechargeable lithium battery cell fabricated according to Comparative Example 2, the charge rate capability were improved while having similar discharge rate capability.

Evaluation 3: Cycle-Life Characteristic

Cycle-life characteristics of the rechargeable lithium battery cells fabricated according to Example 2 and Comparative Example 2 were evaluated.

The cycle-life characteristics were evaluated while repeatedly charging and discharging the cells at 30 C. The voltage of the cells at the end of the charging cycles are shown in FIG. 3.

Figure 3:
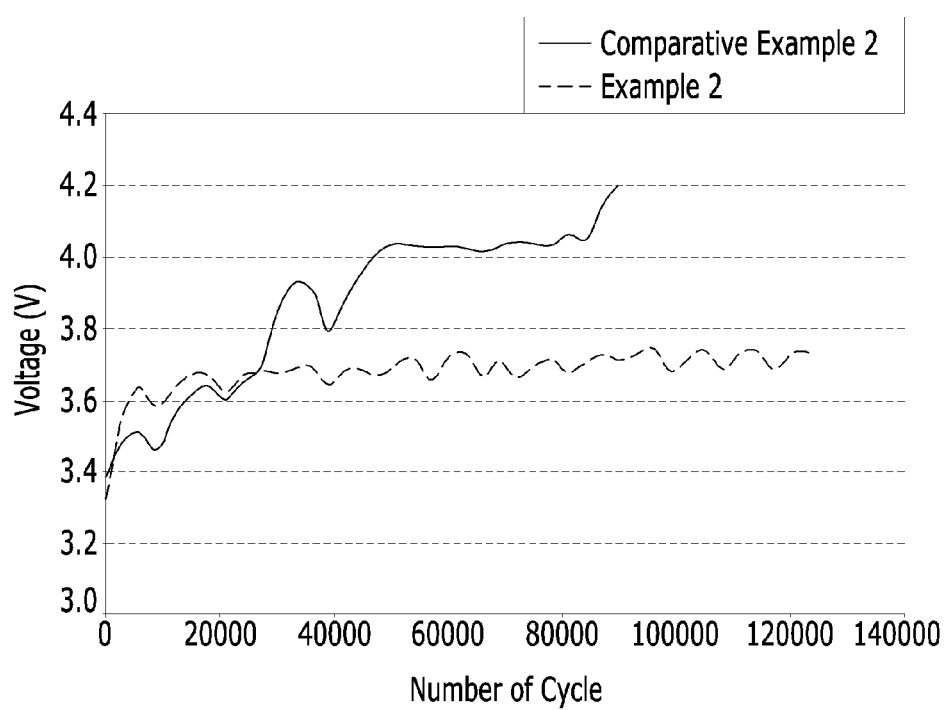
FIG. 3 is a graph of the cycle-life characteristics of rechargeable lithium battery cells fabricated according to Example 2 and Comparative Example 2.

FIG. 3 is a graph showing cycle-life characteristics of the rechargeable lithium battery cells fabricated according to Example 2 and Comparative Example 2. It may be seen from FIG. 3 that when the rechargeable lithium battery cell fabricated according to Example 2 was compared with the rechargeable lithium battery cell fabricated according to Comparative Example 2, the voltage increase relative to the number of cycles was not high. It may be seen from the result that the rechargeable lithium battery cell fabricated according to Example 2 had improved cycle-life characteristics, compared with the rechargeable lithium battery cell fabricated according to Comparative Example 2.

Evaluation 4: Low-Temperature Characteristics

Using the rechargeable lithium battery cell fabricated according to Example 2 and Comparative Examples 1 and 2, three types of battery packs such as 3S6P (module 1), 3S5P (module 2) and 3S4P (module 3) were manufactured, and then the low-temperature characteristics for the battery packs were evaluated.

Low-temperature characteristics were evaluated through a cold cranking ampere (CCA) method. The cold cranking ampere (CCA) method was performed by discharging the battery packs having the rechargeable lithium battery cells fabricated according to Example 2 and Comparative Examples 1 and 2, in a fully charged state, in a −25° C. chamber at a current of 1000 Å, and allowing them to stand for 1 second, to obtain voltage variation. The results were shown in FIG. 4.

Figure 4:
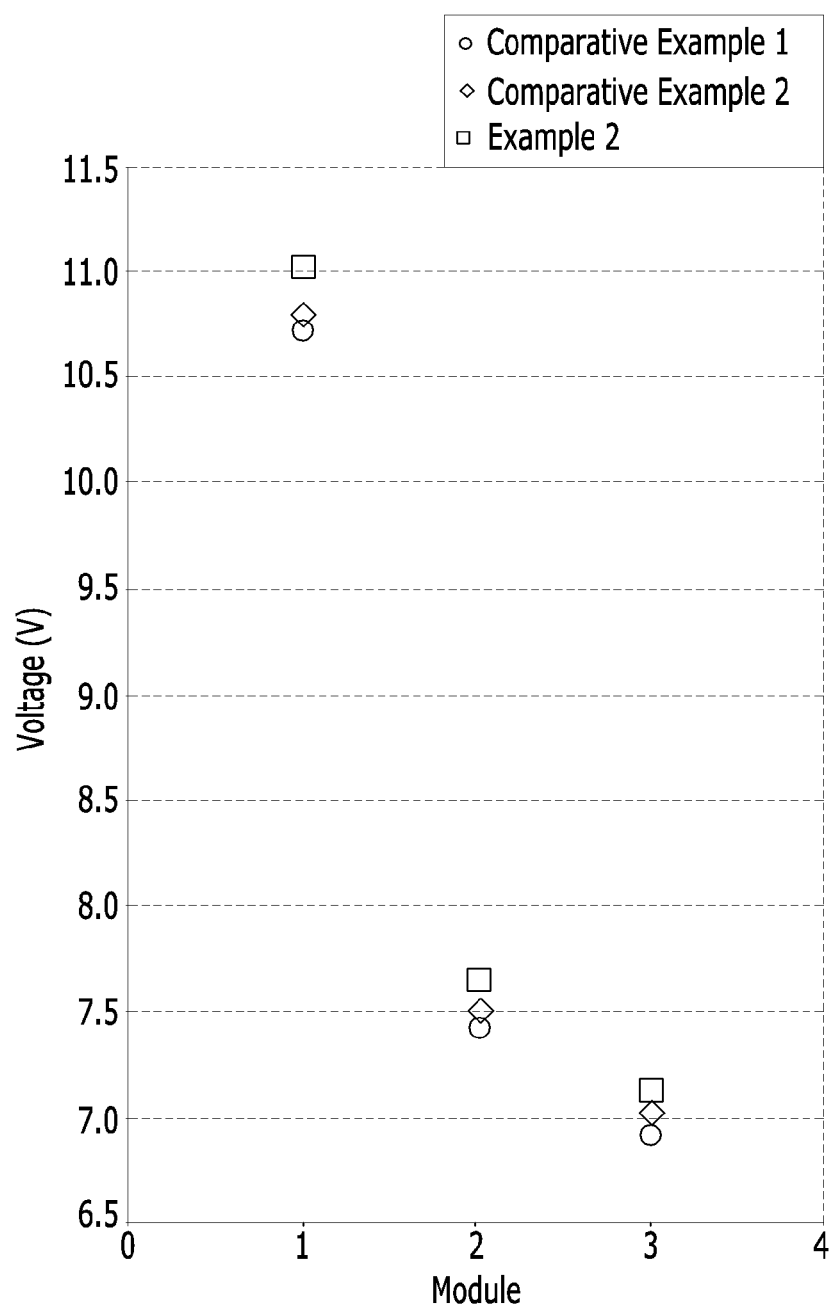
FIG. 4 is a graph of the low-temperature characteristics of rechargeable lithium battery cells fabricated according to Example 2 and Comparative Examples 1 and 2.

FIG. 4 is a graph showing low-temperature characteristics of the rechargeable lithium battery cells fabricated according to Example 2 and Comparative Examples 1 and 2.

Referring to FIG. 4, when the rechargeable lithium battery cell fabricated according to Example 2 was compared with the rechargeable lithium battery cells fabricated according to Comparative Examples 1 and 2, the resulting voltage was high. It may be seen that when the rechargeable lithium battery cell fabricated according to Example 2 was compared with the rechargeable lithium battery cells fabricated according to Comparative Examples 1 and 2, the low-temperature characteristics were improved.

It may be seen from these results that the rechargeable lithium battery cell fabricated according to embodiments of the present invention had high charge and discharge rate capabilities, improved cycle-life characteristics, and stable low-temperature characteristics.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. An electrolyte for a rechargeable lithium battery, the electrolyte comprising:
   a lithium salt,
   a non-aqueous organic solvent,
   a first additive represented by the following Chemical Formula 1, and a second additive represented by the following Chemical Formula 2:

Chemical Formula 1

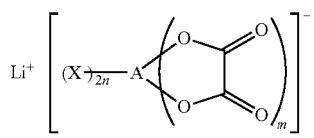

wherein, in Chemical Formula 1, A is phosphorus (P), X is a halogen, n is an integer ranging from 0 to 2, m is an integer ranging from 1 to 3, and n+m=3, Chemical Formula 2

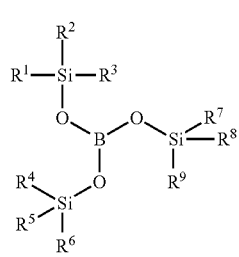

wherein in Chemical Formula 2, $R^1$ to $R^9$ are each independently selected from the group consisting of hydrogen, a substituted C1 to C10 alkyl group, and an unsubstituted C1 to C10 alkyl group.

2. The electrolyte for a rechargeable lithium battery of claim 1, wherein the first additive comprises a compound selected from the group consisting of compounds represented by the following Chemical Formulae 1c to 1e and combinations thereof:

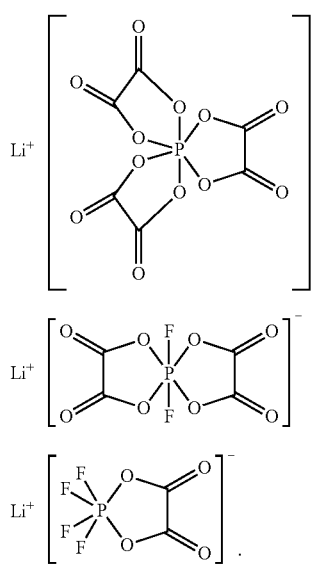

Chemical Formula 1c

Chemical Formula 1d

Chemical Formula 1e

3. The electrolyte for a rechargeable lithium battery of claim 1, wherein the first additive is included at about 0.1 wt % to about 5 wt % based on the total weight of the electrolyte and the second additive is included at about 0.1 wt % to about 5 wt % based on the total weight of the electrolyte.

4. The electrolyte for rechargeable lithium battery of claim 1, wherein the first additive is included at about 0.5 wt % to about 1.5 wt % based on the total weight of the electrolyte.

5. The electrolyte for rechargeable lithium battery of claim 1, wherein the second additive is included at about 0.1 wt % to about 1 wt % based on the total weight of the electrolyte.

6. An electrolyte for a rechargeable lithium battery, the electrolyte comprising:
   a lithium salt,
   a non-aqueous organic solvent,
   a first additive, and
   a second additive,
   wherein the first additive comprises a compound represented by the following Chemical Formula 1 d, and the second additive comprises a compound represented by the following Chemical Formula 2a:

Chemical Formula 1d

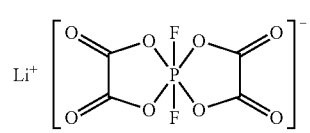

Chemical Formula 2a

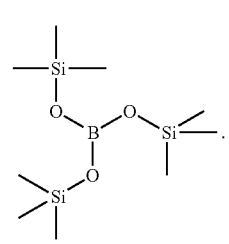

7. The electrolyte for rechargeable lithium battery of claim 1, wherein the non-aqueous organic solvent comprises ethylene carbonate (EC), ethylmethyl carbonate (EMC), and dimethyl carbonate (DMC), and the ethylene carbonate (EC) is included at greater than or equal to about 30 wt % based on the total weight of the non-aqueous organic solvent.

8. A rechargeable lithium battery, comprising:
   a positive electrode including a positive active material layer,
   a negative electrode including a negative active material layer, and
   the electrolyte according to claim 1.

9. A rechargeable lithium battery, comprising:
   a positive electrode including a positive active material layer,
   a negative electrode including a negative active material layer, and
   an electrolyte,
   wherein the positive active material layer comprises lithium metal oxide and activated carbon, and
   wherein the electrolyte comprises:
   a lithium salt,
   a non-aqueous organic solvent,
   a first additive represented by the following Chemical Formula 1, and
   a second additive represented by the following Chemical Formula 2:

Chemical Formula 1

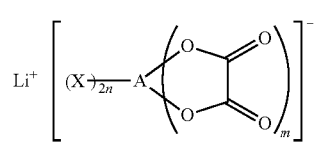

wherein, in Chemical Formula 1, A is boron (B) or phosphorus (P), X is a halogen, n is an integer ranging from 0 to 2, m is an integer ranging from 1 to 3, and when A is boron (B), n+m=2, and when A is phosphorus (P), n+m=3, Chemical Formula 2

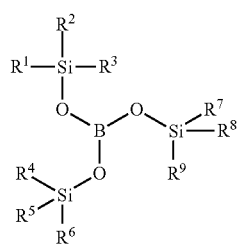

wherein in Chemical Formula 2, $R^1$ to $R^9$ are each independently selected from the group consisting of hydrogen, a substituted C1 to C10 alkyl group, and an unsubstituted C1 to C10 alkyl group.

10. The rechargeable lithium battery of claim 9, wherein the activated carbon is included at about 0.01 wt % to about 20 wt % based on the total weight of the lithium metal oxide and activated carbon.

11. The rechargeable lithium battery of claim 8, wherein the negative active material layer comprises soft carbon.

12. The rechargeable lithium battery of claim 8, wherein the first additive is present on at least one of the positive electrode or the negative electrode, the second additive is present on at least one of the positive electrode or the negative electrode, the first additive is in the electrolyte at about 0.005 M to about 2 M, and the second additive is in the electrolyte at about 0.005 M to about 2 M.

13. The rechargeable lithium battery of claim 8, wherein the rechargeable lithium battery further comprises a SEI (solid electrolyte interface) film on the surface of the negative electrode.

* * * * *